United States Patent [19]

Smith, Jr.

[11] 4,102,329

[45] Jul. 25, 1978

[54] SYSTEM FOR COLLECTING SOLAR ENERGY

[76] Inventor: Arthur V. Smith, Jr., 6525 Independence St., Arvada, Colo. 80004

[21] Appl. No.: 780,769

[22] Filed: Mar. 24, 1977

[51] Int. Cl.² ............................................. F24J 3/02
[52] U.S. Cl. .................................... 126/271; 237/1 A
[58] Field of Search ................ 126/270, 271; 237/1 A

[56] References Cited

U.S. PATENT DOCUMENTS

| | | | |
|---|---|---|---|
| 3,841,302 | 10/1974 | Falber | 237/1 |
| 3,923,039 | 12/1975 | Falber | 126/271 |
| 4,003,366 | 1/1977 | Lightfoot | 237/1 |
| 4,026,269 | 5/1977 | Stelzer | 237/1 |
| 4,043,316 | 8/1977 | Arent | 237/1 |

*Primary Examiner*—Kenneth W. Sprague
*Attorney, Agent, or Firm*—Ronald F. Weiszman

[57] ABSTRACT

A system for collecting solar energy comprising a plurality of collecting units pivotally mounted to a shiny support surface. Each unit has a first plate member with at least one reflecting side, a second plate member joined to the first plate member and pivotally mounted to the support surface, and a collecting means positioned between the two plate members. The system includes a control means for pivoting the units about their axis in unison to expose the collecting means of each unit to direct and indirect sunlight. Nearly all of the sunlight falling between any pair of units is either received directly by the collecting means of one of the pair of units or indirectly by reflection off the shiny support surface and the reflecting side or sides of the other unit in the pair. The units are positionable in a closed position in which the first plate members overlap to protect the collecting means of each unit. The system is particularly suitable for use in a limited area such as the roof or walls of a house.

17 Claims, 5 Drawing Figures

SYSTEM FOR COLLECTING SOLAR ENERGY

BACKGROUND OF THE INVENTION AND PRIOR ART

Solar energy collecting systems have become increasingly important as the cost of conventional fuels has risen. Improvements in the efficiency of solar energy collecting systems have made solar energy a valuable source of power even in areas with relatively little direct sunlight. The efficiency of a solar energy system is dependent as much upon the design of each individual collecting unit as upon the arrangement of the individual unit or units in relation to the moving sun and to each other. An individual collecting unit may be very efficient when used alone but uneconomical when used with similar units in a system operating in a limited area such as on the roof of a house. Often, each of these more efficient units requires a lot of space and any crowding of them results in the shading of one unit by another. If the units are designed to move, then crowding of them usually interferes with their necessary movement for peak efficiency. Consequently, a system of any such units when used in a limited area would collect much less than 100% of the sunlight striking the area.

Most prior solar energy collecting systems have an individual collecting unit or units that are fixed in relation to the moving sun. The unit or units do not move to follow the sun as it crosses the sky and if there are plural units, each unit usually operates independently of the others. These systems often involve the use of an elaborately designed reflector. The reflector is stationary and is shaped to always reflect the rays of the moving sun onto the collector. Examples of these systems include U.S. Pat. No. 3,179,105 issued to Falbel; U.S. Pat. No. 2,625,930 issued to Harris; and U.S. Pat. No. 3,331,012 issued to Hervey.

Other solar energy collecting systems include those that are movable to follow the sun such as U.S. Pat. No. 3,923,039 issued to Falbel. Units like Falbel's are designed to maximize the efficiency of an individual unit and it is often difficult to efficiently use a plurality of such units in a system operating in a limited area such as on a roof.

SUMMARY OF THE INVENTION

This invention involves a new and novel arrangement for collecting solar energy falling on a limited area such as the roof of a house. The inventor includes a plurality of solar energy collecting units pivotally mounted to a support surface. The support surface is preferably shiny to reflect sunlight. Each collecting unit has a collecting means such as pipes through which a fluid is being circulated. The collecting means of each unit is positioned between a first and second plate member. The first plate member has at least two sides, at least one of which is a reflector. The first and second plate members are joined at an angle of about 90° and the second plate member is pivotally mounted to the support surface. The pivoted axis of the units are substantially parallel and the units are pivoted about the asix in unison.

During the day, the units are positioned so that sunlight falling on the support surface between any pair of units and on the reflecting side of the first plate member of one of the pair of units is reflected onto the collecting means of the second unit. At night, the units are positioned with the first plate members substantially parallel to the support surface. The first plate members extend in a direction normal to the pivotal axis for a distance greater than the distance between the axis so that the first plate members are positionable at night to overlap and protect the collecting means of the units.

OBJECTS OF THE INVENTION

It is an object of this invention to provide a new and novel arrangement of individual solar energy collecting units.

It is an object to provide a solar energy collecting system that collects nearly all of the sunlight striking an area.

Another object is to provide a solar energy collecting system that collects sunlight striking a house during the day and insulates the house at night.

It is an object to provide a solar energy collecting system with individual collecting units that are movable to follow the sun across the sky.

Another object is to provide a solar energy collecting system designed to be used on the walls and roof of a house.

It is an object to provide a solar energy collecting system with movable, individual collecting units that cooperate with each other to reflect and collect nearly all of the sunlight striking an area.

Another object is to provide a solar energy collecting unit whose individual collecting units are movable to a position to shield the collecting means of each unit from damage.

Another object is to provide a solar energy collecting system with improved efficiency for collecting sunlight falling on a limited area.

Other objects and advantages of the present invention will become apparent from the following description and accompanying drawings.

DETAILED DESCRIPTION OF THE PREFERRED EMBODIMENT

Figure 1:
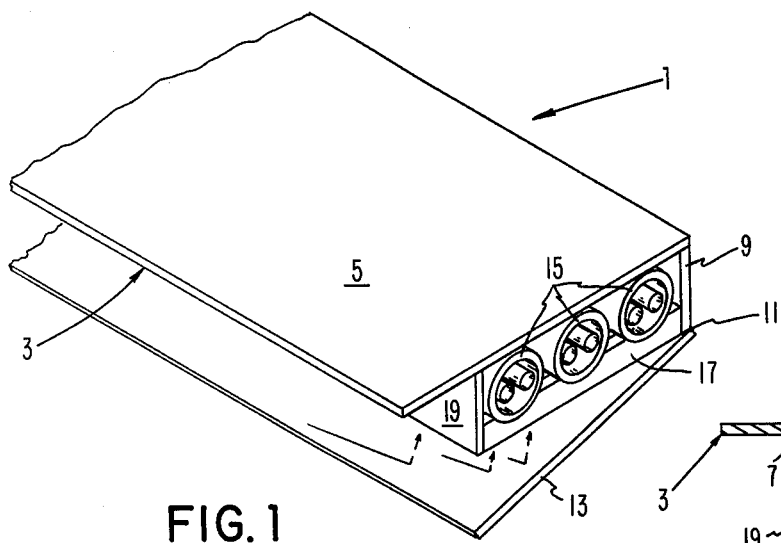
FIG. 1 is a perspective view of a collecting unit and the support surface.
Figure 2:
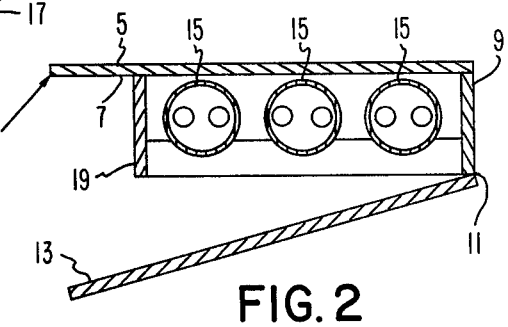
FIG. 2 is a cross-sectional view of a collecting unit showing the plate members, pipes, and a supporting member.

As best seen in FIGS. 1 and 2, each solar energy collecting unit 1 has a first plate means 3 with a reflecting side 5 and a second side 7 and a second plate means 9. The first and second plate means 3 and 9 are joined at an angle of about 90°. The second plate means 9 is pivotally mounted by a hinge 11 to a support surface 13 for movement about an axis. The support surface 13 is preferably made of shiny material to reflect sunlight. Positioned between the first and second plate means 3 and 9 is a collecting means consisting of pipes 15 through which a fluid is being circulated. The pipes are supported by members 17 which are spaced from each other in the direction of the pivoted axis. The support members 17 can be attached only to the second plate means 9 or can be attached to the second plate means 9 and a third plate means 19. In the preferred embodiment, the pipes 15 of each unit 1 are connected by a flexible pipe (not shown) in the area of the hinge 11 to a fluid circulating system within the house.

Figures 3, 4:
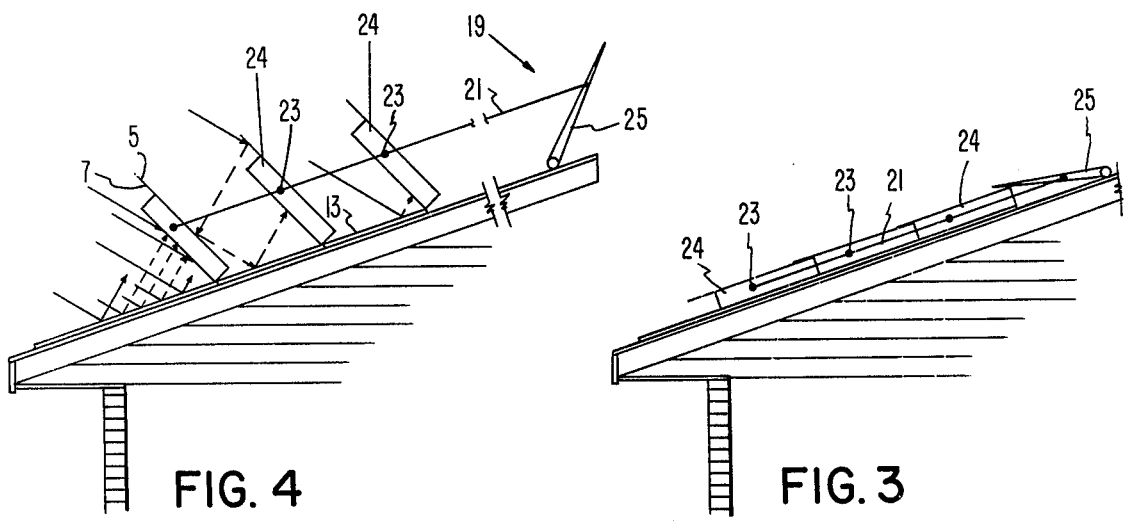
FIG. 3 shows the units in their preferred closed position at night with the first plate members overlapping to protect the collecting means of each unit.
FIG. 4 shows the units in an open position with sunlight being reflected off of the support surface and the reflecting sides of the first plate members onto the collecting means of the units.

Referring to FIGS. 3 and 4, the pivotal axis of the units 1 are substantially parallel and the units 1 are moved in unison by the control means 19. Control means 19 comprises rod member 21 pivotally connected at 23 to the side plate means 24 of each unit 1 and control lever 25. The spacing of the pivotal connections 23 from the support surface 13 is progressively greater as the connections 23 approach the control lever 25. This insures that the units 1 will not be locked in the closed position of FIG. 3.

The first plate means 3 extends in a direction normal to the pivotal axis of the units 1 for a distance greater than the spacing between the pivotal axis. This enables the first plate means 3 to overlap each other in the closed position of FIG. 3 and improves the reflecting efficiency of the units 1 when in operation as in FIG. 4.

In operation, control lever 25 is moved from the position shown in FIG. 3 to the position of FIG. 4 to expose the collecting means of pipes 15 to direct and reflected sunlight. The second side 7 of the first plate means 3 is preferably also a reflecting surface. Sunlight striking the shiny support surface 13 directly or indirectly from reflection off the first side 5 and/or second side 7 of the first plate means 3 is reflecting onto the collecting means 15 of the units 1. As seen in FIG. 4, nearly all of the sunlight striking the roof of the house is focused on the collecting means of the units 1. The positioning of the collecting means is dictated by the location of the sun and plate 3 may be aligned with the rays of the sun or offset as necessary to gain maximum collecting efficiency.

Figure 5:
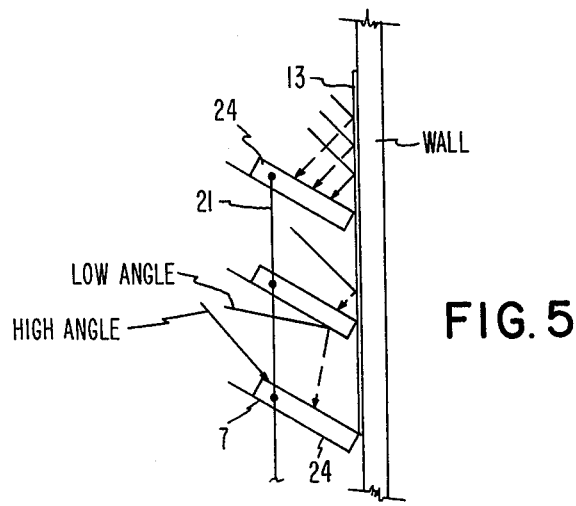
FIG. 5 shows the use of the arrangement of the invention on a wall of a house.

FIG. 5 illustrates the invention in use on an outside wall of a house. The inclusion of a system on the roof and walls of a house greatly enhances the operation of the overall heating system. This is particularly true in regions where the winter sun is very low in the sky and strikes the roof at a very slight angle.

In the closed position of FIG. 3, the system not only protects the collecting means 15 but also serves to prevent heat from escaping from the house in the winter time. In summer, the system can either be open to collect energy or closed to reflect sunlight and keep the house cool.

The support surface 13 and sides of the plate means 3, 9, 19, and 24 are preferably all made of shiny material such as aluminum, reflecting plastic, or the like. In one embodiment, the third plate means 19 is clear. The collecting means of each unit 1 can be a variety of known collecting mechanisms and is preferably a pipe system circulating water, oil, air, or the like. The circulating fluid can include suitable antifreeze additives to resist freezing. The pipes 15 can be clear with blackened fluid flowing within or made of absorbing material such as copper. The support for the pipes 15 may be a fourth plate means that is clear. In that embodiment, the pipes 15 are totally enclosed to create a hot house effect. The support surface 13 can be fixed to the walls or roof of the house or can be slideable relative to the house. The arrangement for moving the units about their pivotal axis can be manual or automatic and operated in increments or continuously to follow the sun across the sky.

What is claimed is:

1. A system for collecting solar energy comprising:
   (a) a plurality of solar energy collecting units each of said units comprising;
   a flat planar solar reflecting support surface,
   enclosure means having a flat planar solar reflecting outer surface and an inside surface opposite to said reflecting surface for mounting solar energy collecting means,
   means for pivotally mounting the enclosure means to the support surface for rotation with respect to said support surface about a pivotal axis,
   solar energy collecting means mounted within said enclosure means between said inside surface and said support surface for collecting solar energy,
   (b) whereby said solar energy collecting units can be mounted to a structure side by side such that each enclosure means can be positioned such that the collector means are enclosed and protected or can be rotated about its pivotal axis for aligning its collecting means to direct sunlight and to reflected sunlight from the support surface and from the outer reflecting surface of the enclosure means on an adjacent unit.

2. The system of claim 1 wherein said inside surface of said enclosure means has a solar reflecting surface.

3. The system of claim 1 further including:
   (a) means to move each of said collecting units about the respective pivotal axis thereof.

4. The system of claim 1 further including:
   (a) means to move each of said collecting units in unison about a respective pivotal axis thereof.

5. The system of claim 1 wherein said support surface is part of the outside of a house and is made of a shiny material to reflect sunlight.

6. The system of claim 1 wherein the pivotal axes of said collecting units are substantially parallel.

7. The system of claim 6 wherein
   said pivotal axes are spaced from each other a distance less than the extent of the reflecting outer surface of said enclosure means substantially normal to said pivotal axes whereby said outer surfaces can be positioned to overlap.

8. A solar heat collecting system for use on a building or structure comprising:
   (a) a reflective base plate mounted directly to said building or structure;
   (b) a multiplicity of solar energy collectors;
   (c) a box-like holder in which said collectors are secured pivotally mounted to said reflective base plate and having a solar reflective outer surface;
   (d) said box-like holder occupying a first closed position wherein said collectors are totally enclosed between said box-like holder and said reflective base plate;
   (e) said box-like holder being movable from said first closed position pivotally about a first side which remains pivotally secured to said reflective base plate to a second open position wherein a second side of said box-like holder is removed from said reflective base plate a predetermined distance; and
   (f) said reflective base plate reflects solar rays into said box-like holder and onto said collector when said box-like holder assumes said second, open position.

9. A solar heat collecting system as claimed in claim 8, wherein:
   (a) said reflective base plate has a width greater than a width of said box-like holder.

10. A solar heat collecting system as claimed in claim 8, including:
 (a) a mechanical system for moving said box-like holder from said first closed position to said second open position wherein said predetermined distance may be any of a variety of distances depending upon a direction of said solar rays.

11. A solar heat collecting system as claimed in claim 8 wherein:
 (a) said reflective base plate is mounted to a roof portion of said building or structure.

12. A solar heat collecting system as claimed in claim 8 wherein:
 (a) said reflective base plate is mounted to a side wall of said building or structure.

13. A solar heat collecting system as claimed in claim 8 wherein:
 (a) said reflective base plate is slideably mounted to said building or structure side to be slideably movable thereon.

14. A solar heat collecting system as claimed in claim 8, wherein:
 (a) said box-like holder is reflective on both an inside surface and an outside surface.

15. A solar heat collecting system as claimed in claim 8 wherein:
 (a) said solar energy collectors are pipes transporting a fluid.

16. A solar heat collecting system as claimed in claim 15 wherein:
 (a) said pipes transporting fluid are enclosed in transparent tubes.

17. A solar heat collecting system as claimed in claim 8, wherein:
 (a) a multiplicity of said box-like holders are combined; and
 (b) said second side of said box-like holder includes a protruding portion which overlays an adjoining one of said box-like holders when said box-like holders are in said first closed position.

* * * * *